Nov. 27, 1956 L. SCHMID 2,771,975
SYNCHRONIZING MECHANISM FOR SPEED CHANGE
GEAR SYSTEMS OF AUTOMOTIVE VEHICLES
Filed March 20, 1953 2 Sheets-Sheet 1

INVENTOR
Leopold Schmid
BY
ATTORNEYS

Nov. 27, 1956    L. SCHMID    2,771,975
SYNCHRONIZING MECHANISM FOR SPEED CHANGE
GEAR SYSTEMS OF AUTOMOTIVE VEHICLES
Filed March 20, 1953    2 Sheets-Sheet 2

INVENTOR
Leopold Schmid
BY
Pennie, Edmonds, Morton, Barrows & Taylor
ATTORNEYS

United States Patent Office 2,771,975
Patented Nov. 27, 1956

2,771,975

SYNCHRONIZING MECHANISM FOR SPEED CHANGE GEAR SYSTEMS OF AUTOMOTIVE VEHICLES

Leopold Schmid, Stuttgart-Sillenbuch, Germany, assignor to Dr. Ing. h. c. F. Porsche K.-G., Stuttgart-Zuffenhausen, Germany Application March 20, 1953, Serial No. 343,650

Claims priority, application Germany March 25, 1952

16 Claims. (Cl. 192—48)

This invention relates to improvements in synchronizing mechanisms for change speed gear systems particularly intended for automotive vehicles.

More particularly the invention relates to improvements in synchronizing mechanisms of the type including split spring rings carried by clutch members and adapted to be engaged by a set of internal teeth carried by a laterally shiftable member, which, after synchronization, is brought into meshing engagement with a set of external clutch teeth carried by one of the clutch members.

The invention of the present application is an improvement on the invention disclosed in my pending application Ser. No. 260,059, filed December 5, 1951, now Patent No. 2,736,411, which describes and claims a synchronizing mechanism for change-speed gears including split spring rings arranged in the manner referred to above.

In synchronizing mechanisms of this type, it is necessary that the synchronizing spring rings undergo a considerable amount of compression and come into an intimate snug contact with the shiftable member, such as a laterally slidable sleeve. Normally this is accomplished only by the provision of a correspondingly long shift path which the clutch teeth of the shiftable member or sleeve must traverse or cross, since it is not permissible or possible to make the angle of slope of the interengaging surfaces, which are moved laterally with respect to each other, too steep in order to obtain small meshing forces. Neither is it possible to cause the synchronizing rings to make contact with equal radially-directed forces. In the past, it has not been possible to solve the foregoing difficulties by the expedient of centering the synchronizing rings by means of centering surfaces or bodies.

An important object of the invention and also an important point to take account of is that the periphery of the synchronizing rings be given a configuration such that synchronization is effectively obtained before the teeth of the sleeve and clutch members are brought into meshing engagement.

A further object of the invention is to provide an improved form of synchronizing ring, which effectively cooperates with other elements of the change-speed gears for effecting synchronization in a short shift path.

Another object of the invention is to provide a synchronizing mechanism for change-speed gears which will permit the making of the change-speed gears system much shorter than has been possible in the past.

In accordance with the present invention, the foregoing difficulties are overcome and the objects and advantages are attained by providing a synchronizing mechanism as described hereinafter, one important feature of which is the provision of a synchronizing structure including prestressed split spring rings which are arranged to be placed under further stress or compression during the shifting operation. The pretensioning of the synchronizing rings effects a "soft" gear change, since the shift path is considerably shortened from that which it otherwise would be, making it possible to decrease the overall structural length of the gear system.

In a preferred form of construction, each split spring ring is mounted in an annular groove in the side face of the clutch member, such groove including the inner side portion of the external set of clutch teeth of the clutch member. In this construction, the peripheral or crown surface of the spring ring is provided with an offset part cut into the corner of the ring adjacent the clutch member and which is held by the annular groove of the clutch member.

According to the invention, the split spring synchronizing rings are not of uniform thickness throughout but have their maximum wall thickness at the point of maximum bending stress, the wall thickness tapering off from this point towards the respective ends of the rings. The thickness of the rings preferably decrease at a uniform rate toward their ends, or the thickness of the ring increases at a uniform rate from the ends toward the diametrically opposite side of the ring. Furthermore, the thickness of the synchronizing rings in the middle between the point of maximum bending moment or stress and the slit of the rings is essentially smaller than the width of the ring, which is preferably uniform. Synchronizing rings constructed in this manner provide a shifting contact along the periphery of the ring which is substantially constant, which results in a "soft" shift as well as a uniform and relatively small wear on the engaging parts of the synchronizing mechanism.

The synchronizing rings according to the present invention are also advantageously provided with a peripheral surface composed of a conical or beveled part facing the shiftable sleeve and next adjacent thereto a cylindrical part extending to the offset part, which extends into the annular groove of the clutch member with which the ring is associated. In this form of construction, the cylindrical part of the peripheral contact surface forms with the conical part an angle which is, in any case, no greater than 25° and is preferably much less than this, and at the point of transition from the conical part to the cylindrical part a rounded off part is provided whereby the contact pressure of the surfaces between the shiftable sleeve and the synchronizing ring is greatly reduced from what it otherwise would be. In a similar manner, the point of transition from the conical to the cylindrical part of the crowns of the internal set of clutch teeth of the shiftable sleeve may be rounded off in the same manner in order to further lower the contact pressure.

In a change speed gear system according to the invention, a sleeve carrier is mounted in a known manner between a pair of synchronizing rings carried respectively by a pair of clutch members. According to the present invention, this sleeve carrier is provided at several regularly spaced points around its periphery with axially extending projections which serve as guide bars or webs for the shiftable sleeve surrounding the sleeve carrier, thus making it possible to have a very narrow shiftable sleeve while still affording a means for reliably guiding the sleeve during shifting operations, either to one side or to the other, the sleeve carrier being provided or formed with at least three but not more than six of the axially or laterally extending guide bars.

In the accompanying drawings forming a part of this application, one particular form or embodiment of the invention, including other features, is illustrated by way of example.

Figure 1:
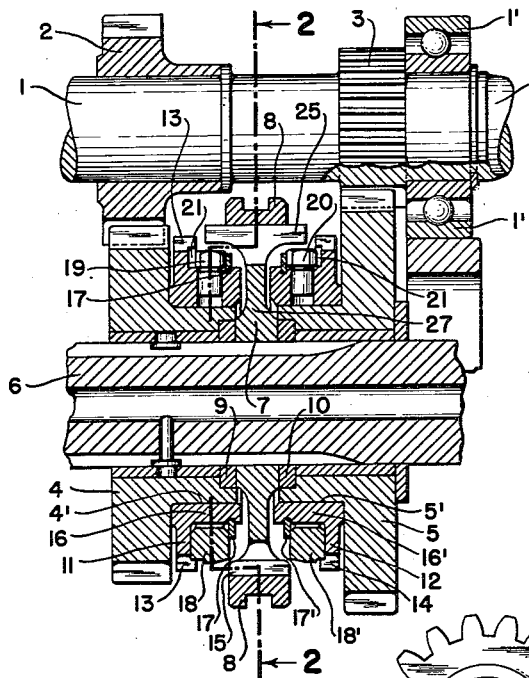
Fig. 1 is a broken vertical longitudinal sectional view through a change speed gear system constructed in accordance with the invention.
Figure 2:
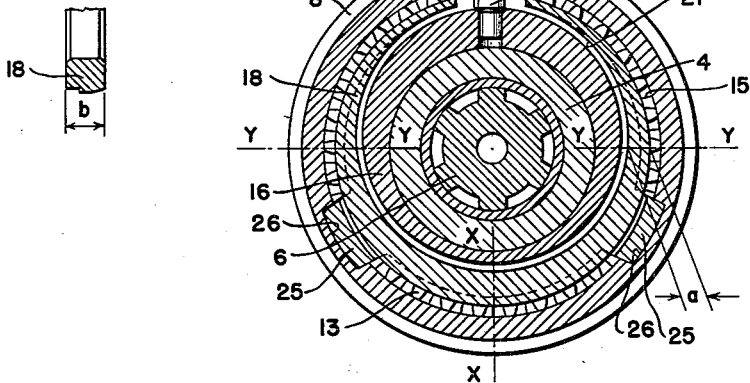
Fig. 2 is a vertical sectional view taken on the irregular line 2—2 of Fig. 1.

Referring to Figs. 1 and 2 of the drawings, the gear system illustrated includes a driving shaft 1 mounted in a bearing 1' and rigidly connected to respectively larger and smaller gears 2 and 3 which permanently mesh with respectively smaller and larger gears 4 and 5, the latter of which are rotatably but not slidably mounted on thin bearing sleeves on a driven shaft 6. A sleeve carrier or hub 7 is keyed to the driven shaft 6 and fixed thereto between the gears 4 and 5. The sleeve carrier 7 carries a laterally shiftable sleeve 8 having the usual peripheral groove for receiving a shifting yoke not shown. Abutment discs 9 and 10, respectively on opposite sides of the hub or sleeve carrier 7 are arranged on the shaft 6 between the sleeve carrier 7 and the inwardly projecting hubs 4' and 5' of the gears 4 and 5, respectively. Similar clutch members 11 and 12 having external sets of clutch teeth 13 and 14, respectively, are mounted by a force fit, respectively on the inwardly projecting hubs 4' and 5' of the gears 4 and 5, for use in connecting up either of these gears to the shaft 1. The shiftable sleeve 8 is provided with an internal set of clutch teeth 15, which at the conclusion of a gear changing operation are adapted to come into meshing engagement with the clutch teeth 13 or 14, depending on the direction in which the sleeeve 8 is shifted, the sleeve 8 being keyed to the hub or sleeve carrier 7 so that the shaft 6 will drive gears 4 or 5 and in turn drive the shaft 1.

The clutch members 11 and 12 are respectively provided with inwardly extending hubs 16 and 16', of similar thickness and shape, but having the eccentric annular cross-sectional shape as shown in Fig. 2. Around these hubs 16 and 16' are mounted in spaced relation split spring synchronizing rings 18 and 18', respectively, these rings being held against longitudinal or axial displacement with respect to the clutch members by means of rings 17 and 17', fitted in peripheral grooves of the hubs 16 and 16', respectively. The split spring rings 18 and 18' are of the same structure with similar structural elements of the two rings arranged opposite each other. Any substantial rotational movement of the rings 18 and 18' relative to the respective clutch members 11 and 12 is prevented by studs 19 and 20, respectively set in the hubs 16 and 16' in the space between the ends of the respective rings in the manner illustrated in Fig. 2 of the drawings. If desired, the studs or equivalent blocks may be welded or otherwise secured in fixed position with respect to the clutch members 11 and 12 or to the hubs of the gears 4 and 5.

The sleeve carrier 7 which constitutes the means for guiding the sleeve 8 and for effecting its rotary movement, is provided at several points around its periphery, for example three, with axially or laterally extending guide bars or webs 25, which project on either side far beyond the body portion 27 of the sleeve carrier. These guide bars 25, as illustrated by the one shown in Fig. 1, extend over substantial portions of the widths of the synchronizing rings 18 and 18', and they occupy positions or spaces 26 in the sleeve 8 where the clutch teeth 15 are removed for that purpose, these positions or spaces being shown in Fig. 2. The structure here described is such that it is possible to make the body 27 of the sleeve carrier 7 very narrow and, therefore, to bring the various structural parts, such as the gears 4 and 5 and members 11 and 12 close together and to the sleeve carrier. The gear train thus becomes much narrower than in known constructions and hence constitutes a very compact combination of elements besides affording means for correctly guiding the shiftable sleeve 8 on the sleeve carrier 7. At least two, and preferably three, guide bars 25 are required on the carrier 7, but not more than six should be used, since such a number would unduly lessen the number of internal clutch teeth 15 of the sleeve 8 and would cause excessive wear on the remaining teeth, the crown surfaces of which frictionally engage the synchronizing rings 18 and 18' in a synchronizing operation.

Figure 3:
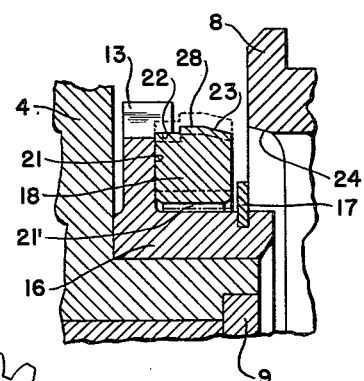
Fig. 3 is a fragmentary sectional view on an enlarged scale in which the pretensioning or prestressing of a synchronizing ring is illustrated.

The inner face of each of clutch members 11 and 12 is formed with an annular groove 21, the periphery of which is concentric with the shaft 6 and is located in the clutch teeth of the clutch member. For example, it will be noted in Fig. 1, that the grooves 21 extend above the bottom of the clutch teeth 13 and 14. On the other hand, the bottoms of the grooves 21 coincide with the peripheral surfaces of the inwardly projecting hubs 16 and 16', respectively. This structure is also illustrated in Fig. 3, from which it will be seen that the crown or peripheral surfaces of the synchronizing rings 18 and 18' are formed with an annular undercut notch or shoulder 22 of cylindrical structure at one side, which bears against the underside of the teeth 13 or 14 when the ring is compressed or prestressed and the part 22 inserted in the groove 21. In its unstressed condition the diameter of part 22 of each synchronizing ring is greater than the outer diameter of the annular groove 21. The size or diameter of the ring 18 when unstressed is indicated in Fig. 3 by a dotted line above the full line showing of the ring. In assembling the gear system, each synchronizing ring is compressed and the part bounded by surface 22 is inserted in the groove 21. Then the ring is released so that its undercut cylindrical surface 22 engages and presses against the outer rim of the groove 21 formed in the lower portion of the clutch teeth 13. The ring, therefore, is mounted in a prestressed or compressed condition against the clutch teeth 13 and retained by ring 17. The ring 18' is assembled and inserted in the same manner.

The synchronizing rings 18 and 18' are of similar tapered shape from the point x—x in Fig. 2 matching the complementary shape of the hubs 16 and 16'. However, the synchronizing rings are spaced sufficiently from the hubs by a space 21', forming an inner continuation of the groove 21, to enable the rings to be compressed to the fullest extent necessary in a synchronizing operation without having their inner surfaces engage the outer peripheries respectively of the hubs 16 and 16'. This condition is indicated by the dot and dash line in Fig. 3.

During a synchronizing operation, the ring 18 is compressed when the teeth 15 of the slidable sleeve 8 are shifted to the left in Fig. 3. As the sleeve 8 slides over the ring 18, the latter is compressed until it assumes the position indicated by the dot and dash lines in Fig. 3, at the same time taking part of the space 21'. Two-thirds of the overall change in diameter of the synchronizing rings is caused by the initial prestressing, while the other one-third is caused by compression during synchronization. This overall change in diameter is from the unstressed condition to a prestressed and compressed condition. It is important that the synchronizing rings be mounted and arranged in prestressed condition, since this greatly reduces the path to be traversed by the sleeve 8 for effecting synchronization over that which would be necessary if the rings were unstressed, assuming the same shape for the beveled or conical surfaces 23 of the rings and of the corresponding beveled or conical surfaces 24 of the engaging teeth of the shiftable sleeve 8. Considerable advantage is achieved from the foregoing, especially with multiple stage gear shift trains comprising a plurality of shiftable sleeves, since it results in a shorter gear system. A further advantage results from the avoidance of shocks during the shifting operation thus rendering the shifting operation easier and more agreeable to perform.

Figure 4:
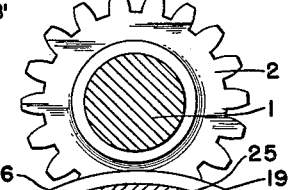
Fig. 4 is a fragmentary sectional view through the synchronizing ring taken along the line x—x of Fig. 2.

In the synchronizing mechanism of the present invention both the configuration and the dimensions of the rings are of extreme importance for synchronization. If for example, a synchronizing ring is used having a uniform thickness then upon reaching a maximum bending moment at point $x$—$x$ with an unstressed synchronization ring a nonconcentric compression results. Rather, the synchronizing ring will undergo an elongation, i. e. it will assume an ellipsoidal shape. When, on making a shift the synchronizing ring is compressed the effect of said shift will become manifest at various places of the periphery by compression forces of different magnitudes, thus rendering the shift "hard." Another consequence is uneven wear along the periphery of the cooperating surfaces of the synchronizing ring and the clutch teeth of the shiftable sleeve. This disadvantage is obviated by locating the maximum thickness of the synchronizing rings at the point of maximum bending moment, i. e. at the point $x$—$x$ (Fig. 2), and by making said thickness progressively smaller towards the ends of the rings. Furthermore, it is necessary to make the thicknesses "$a$" of the synchronizing rings, roughly in the middle $y$—$y$ (Fig. 2) between the point $x$—$x$ of maximum bending moment and the slot, smaller than the width "$b$" of the ring (Fig. 4), taken at point $x$—$x$, since it has been found that the synchronizing ring must act as a ring spring. As such the more favorable the ratio $a:b$ is the more the ring can be prestressed. Moreover, a great amount of prestressing is a prerequisite of a long life for the synchronizing mechanism, because the wear occurring at the crown of the synchronizing ring is compensated for thereby.

It has been discovered that the principal part of the work performed in attaining synchronization, viz. about two-thirds thereof must be achieved within the bounds of or by contact on the conical part 23 of the prestressed synchronization ring whereas about one-third of the synchronizing work is performed in the bounds of or by contact on the cylindrical part 28. Therefore, in order to minimize the forces involved in making the shift from one to the other it has been determined that the angle $\alpha$ (Fig. 5) formed by the conical part 23 with the cylindrical part 28 must be as flat as possible. The optimum values found were 6 to 10°. In any case the angle should be smaller than 25°.

Figure 5:
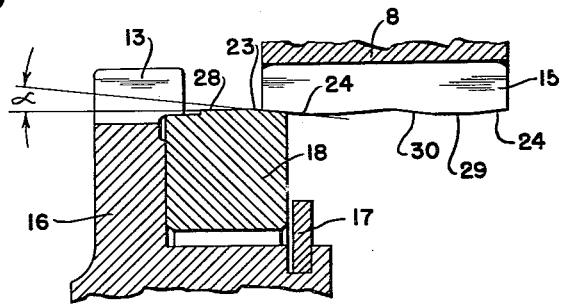
Figs. 5 to 8 are fragmentary sectional views similar to that of Fig. 3 but on a still larger scale illustrating the different positions of the synchronizing parts relative to each other during a synchronizing and gear shifting operation.
Figure 6:
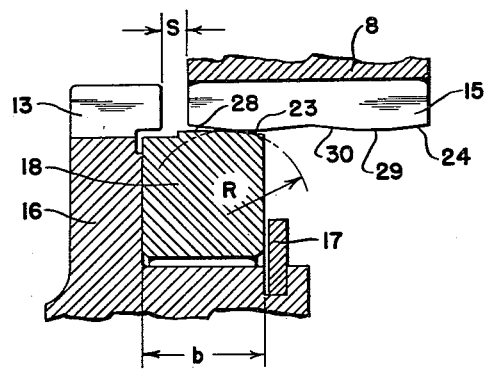

Figs. 1 to 3 of the drawings illustrate the position of the shiftable sleeve in the idling position of the gears while Figs. 5 to 8 show the successive stages of a shifting operation. In Fig. 5 the inner conical portion 24 of the shifting sleeve 8 makes contact with the outer conical part 23 of the synchronizing ring 18. In Fig. 6 the shiftable sleeve 8 has already slid so far towards the engaging teeth 13 as to impart its full compression stress to the synchronizing ring. At this point the surface compression is at its maximum for which reason the transition from the conical part 23 to the cylindrical part 28 is not by way of a sharp edge but via a rounded-off portion with radius R. Any such rounding-off on an arc having a radius R may be effected either on the synchronizing ring or on the shifting sleeve 8, or on both parts. In this way the shifting operation is made easier.

Figure 7:
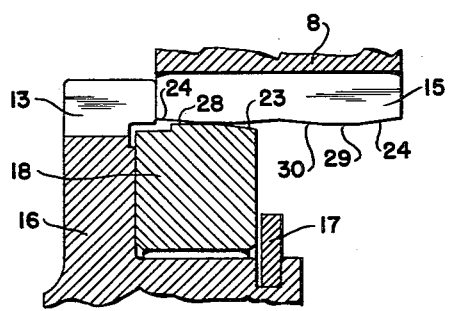
Figure 8:
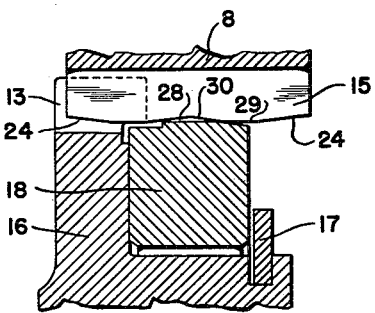

Fig. 7 shows the position of sleeve 8 at the completion of the synchronizing operation. The facing edges of the two sets of teeth 13 and 15 to be brought into meshing engagement are just in mutual contact and the cylindrical part 29 of the teeth 15 is in contact with cylindrical part 28. Fig. 8 shows the completed shifting operation in which the sets of teeth 13 and 15 are in meshing engagement. Any unintentional departure from the shift in this position is prevented by a saddle or inner recess 30 of the slidable sleeve which embraces the cylindrical part 28 with the parts 29 on opposite sides. This saddle 30 in the bore of the slidable sleeve 8 makes it necessary that the cylindrical outer diameter 22 of the synchronizing rings provided for prestressing and centering be offset, i. e., be of smaller diameter than its cylindrical friction surface 28, as shown in Fig. 8. Since the sleeve 8 is shiftable in either direction laterally, the crowns of the teeth 15 have a cylindrical surface 29 and a conical surface or bevel on each side of the saddle 30. With respect to the rings 18 and 18', Fig. 5 shows the width of the conical part 23 of the synchronizing rings must in any case be smaller than one-half the total width "$b$" of the synchronizing rings (Fig. 4), i. e., in the intermediate shifting position during the shift-making operation, as shown in Fig. 6, there must always be a gap "$s$" between the shiftable sleeve and the meshing teeth 13.

I claim:

1. A synchronizing mechanism for change speed gear systems, comprising a shaft, a clutch member having clutch teeth and mounted for rotation on said shaft, a compressible split spring ring carried on a side face of the clutch member, means for holding the ring against appreciable relative rotation with respect to the clutch member, a slidable member mounted on and rotatable with said shaft, said slidable member being mounted adjacent to the ring and having internal clutch teeth, said slidable member being arranged to be shifted to engage its clutch teeth with the peripheral surface of said split spring ring for effecting synchronization and then to engage its clutch teeth with the clutch teeth of the clutch member, and means for holding said split spring ring in a compressed prestressed condition on the clutch member when not engaged by the clutch teeth of the shiftable member, whereby a soft gear change is effected and the shift path is considerably shortened.

2. A synchronizing mechanism as claimed in claim 1, in which the clutch member includes an annular groove in said side face in which said spring ring is mounted in a compressed prestressed condition.

3. A synchronizing mechanism as claimed in claim 2, in which the crown of the spring ring adjacent to the clutch member includes a peripheral surface stepped-in from the crown and engaging the peripheral surface of the groove in the clutch member when the ring is not engaged by the slidable member.

4. A synchronizing mechanism as claimed in claim 1, in which the spring ring has its greatest radial thickness at its point of maximum bending moment, the radial thickness of the ring decreasing from said point toward the respective ends of the ring.

5. A synchronizing mechanism as claimed in claim 1, in which the radial thickness of the spring ring decreases at a constant rate from its side opposite the split in the ring towards its respective ends.

6. A synchronizing mechanism as claimed in claim 1, in which said side face of the clutch member includes an annular groove the outer periphery of which is defined by portions of the clutch teeth of the clutch member, one side portion of said split ring being located in said groove with a portion of its crown surface bearing against the inner portions of the clutch teeth of the clutch member forming the outer periphery of said groove.

7. A synchronizing mechanism as claimed in claim 1, in which said side face of the clutch member includes an annular groove in which said split spring ring is held, the peripheral surface of the ring including a cylindrical part and a conical part on the side of the cylindrical part opposite the clutch member, the angle formed between said parts being at least about 6 degrees and less than 25 degrees.

8. A synchronizing mechanism as claimed in claim 1, in which the peripheral surface of the split spring ring includes a cylindrical part adjacent to the clutch member, a second cylindrical part of greater diameter than the cylindrical part adjacent the clutch member, and a conical part on the side opposite the clutch member, the angle formed between the second cylindrical part and the conical part being at least about 6 degrees and less than 25 degrees, the locus of transition from the conical part to the second cylindrical part of said peripheral surface being rounded off to minimize surface contact pressures when the clutch teeth of the shiftable member are moved from engagement with the conical part to engagement with the second cylindrical part of said peripheral surface.

9. A synchronizing mechanism as claimed in claim 1, in which said shiftable member comprises a sleeve having the internal clutch teeth arranged to be shifted into engagement with the peripheral surface of the split spring ring, the inner peripheral surfaces of the clutch teeth of the sleeve including a part defining a cylinder and a part defining a section of a cone, the latter of which is located between the part defining a cylinder and the clutch member, the locus of transition from one of said parts to the other being rounded off in order to minimize surface contact pressures when the shiftable sleeve is shifted laterally into engagement with the split spring ring.

10. A synchronizing mechanism as claimed in claim 1, in which said shiftable member comprises a sleeve having the internal clutch teeth arranged to be shifted into engagement with the peripheral surface of the split spring ring, the inner peripheral surfaces of the clutch teeth of the sleeve include a portion intermediate the ends of the clutch teeth defining a saddle which embraces the peripheral portion of the split spring ring when the sleeve is shifted into its completed shifting position with its clutch teeth engaging the clutch teeth of the cluch member, whereby any unintentional disengagement of the sleeve with respect to the clutch member is prevented.

11. A synchronizing mechanism for change speed gear systems, comprising a shaft, a clutch member having clutch teeth and mounted for rotation on said shaft, a compressible split spring ring carried on a side face of the clutch member around said shaft, means for holding the ring against appreciable relative rotation with respect to the clutch member, and a slidable member mounted on and rotatable with said shaft, said slidable member being mounted adjacent to the ring and having internal clutch teeth, said slidable member being arranged to be shifted to engage its clutch teeth with the peripheral surface of said split spring ring for effecting synchronization and then to engage its clutch teeth with the clutch teeth of the clutch member, said split spring ring decreasing in radial thickness from its side opposite the split in the ring towards its respective ends, said respective ends being of similar radial thickness.

12. A synchronizing mechanism as claimed in claim 11, including means for holding the split spring ring in a compressed prestressed condition when not engaged by the clutch teeth of the slidable member.

13. A synchronizing mechanism as claimed in claim 11, in which the clutch member includes a hub extending inside the split spring ring, said hub having a peripheral surface eccentric to the axis of the clutch member and substantially uniformly spaced from the inside surface of the ring, the end portions of the ring being arranged over the thickest portion of the hub.

14. A synchronizing mechanism as claimed in claim 11, in which the split spring ring has a width greater than its maximum thickness.

15. A synchronizing mechanism for change speed gear systems including a pair of axially aligned oppositely mounted clutch members having external clutch teeth, a sleeve carrier mounted between said clutch members on the same axis, a laterally shiftable sleeve around the sleeve carrier having an internal set of clutch teeth adapted to mesh with the clutch teeth of either of said clutch members, and a pair of synchronizing compressible split spring rings respectively carried on the side surfaces of said clutch members facing toward the sleeve carrier, said rings being positioned for engagement by the inside surfaces of the clutch teeth of the shiftable sleeve for synchronizing the clutch members with the sleeve and sleeve carrier, said split spring rings being respectively mounted in prestressed condition on the clutch members, said sleeve carrier including a number of radially-projecting axially-extending guide bars each of which is keyed to said laterally shiftable sleeve and extends uniformly on opposite sides of the sleeve carrier to points respectively overlying said rings, whereby said shiftable sleeve is guided laterally by the guide bars into engagement with the respective rings when the sleeve is shifted.

16. A synchronizing mechanism as claimed in claim 15, in which the sleeve carrier has at least two and not more than six guide bars.

References Cited in the file of this patent

UNITED STATES PATENTS

| | | |
|---|---|---|
| 1,967,190 | Cousino | July 17, 1934 |
| 2,470,208 | Avila | May 17, 1949 |
| 2,579,090 | Rabe | Dec. 18, 1951 |

FOREIGN PATENTS

| | | |
|---|---|---|
| 875,903 | France | Oct. 8, 1942 |